United States Patent
Messinger

[19]

[11] Patent Number: 6,042,055
[45] Date of Patent: Mar. 28, 2000

[54] STRUCTURAL JOINT TO ACCOMODATE LARGE THERMALLY-INDUCED DISPLACEMENTS

[75] Inventor: Ross H. Messinger, Tustin, Calif.

[73] Assignee: Boeing North American, Inc., Seal Beach, Calif.

[21] Appl. No.: 08/994,798

[22] Filed: Dec. 19, 1997

[51] Int. Cl.$^7$ .................................................. B64C 1/00
[52] U.S. Cl. .............................. 244/131; 244/132; 403/28
[58] Field of Search .................................. 244/161, 131, 244/132; 403/393, 28, 32; 285/403, 404

[56] References Cited

U.S. PATENT DOCUMENTS

| | | |
|---|---|---|
| 2,406,895 | 9/1946 | Olson . |
| 2,639,788 | 5/1953 | Korsberg et al. . |
| 2,787,185 | 4/1957 | Rea et al. . |
| 3,120,402 | 2/1964 | Wallen . |
| 3,928,950 | 12/1975 | Beynon . |
| 5,297,760 | 3/1994 | Hart-Smith . |

FOREIGN PATENT DOCUMENTS

| | | | |
|---|---|---|---|
| 851457 | 3/1939 | France | 244/131 |
| 1538477 | 9/1968 | France | 285/403 |
| 468948 | 11/1928 | Germany | 403/28 |
| 98968 | 2/1922 | Switzerland | 403/393 |

OTHER PUBLICATIONS

Frosch and Scheuing, Positioning Device for Optical Components, IBM Technical Disclosure Bulletin, vol. 18 No. 10, Mar. 1976, p. 3333.

Recent Advances in Structures for Hypersonic Flight NASA Converence Publication 2065 Part 2, Sep. 6–8 1978, pp. 658–659, N79–1435–45.

*Primary Examiner*—Peter M. Poon
*Assistant Examiner*—Tien Dinh
*Attorney, Agent, or Firm*—Steven E. Kahm; Alston & Bird

[57] ABSTRACT

A thermal expansion joint having a plurality of bendable tabs which flex to minimize the stress caused by thermal expansion. The tabs flex at their slot radii by the base of the tabs, allowing the tip of the tabs to move. Apertures in the tabs near the tip connect the tabs to a solid body or to tabs on another body. The tabs' flexing relieves stress in the body undergoing thermal expansion at the point it is connected to a body which has a different thermal expansion rate and/or experiences a different temperature. A plurality of tabs so connecting two bodies provides a stiff joint and reduces the thickness of the material otherwise needed to provide a connection what will not crack or otherwise break due to thermal strains at the connection between two bodies.

6 Claims, 5 Drawing Sheets

STRUCTURAL JOINT TO ACCOMODATE LARGE THERMALLY-INDUCED DISPLACEMENTS

BACKGROUND OF THE INVENTION

1. Field of the invention

This invention relates to thermal expansion joints and more particularly to thermal expansion joints with tabs that flex to minimize thermal deformations.

2. Description of the related art

Large temperature changes in materials can cause large displacements caused by thermal expansion and contraction of the material. The effect is particularly pronounced in connections between two materials with widely differing thermal expansion coefficients. The thermal changes can be caused by frictional aerodynamic heating of aircraft structures, by loading of cryogenic propellants into tanks, or by any number of other causes. The constrained deflections caused by thermal expansions and contractions can generate potentially destructive stresses on the structures of vehicles such as airplanes and rockets.

In the past, a cryogenic tank would be connected to another cryogenic tank or to another structure by an intertank. The difference in the coefficient of thermal expansion between the cooled tank material and the intertank material creates a large thermal stress at the joint therebetween. Typically the thickness of the material at the joint would be increased to prevent buckling of the material which comprises the shell structure of the rocket. However, increasing the thickness of the material at the joint increases the weight of the vehicle. The penalty for carrying the extra weight is a reduced payload to orbit and slower vehicles.

Aircraft traveling at high speeds have the leading edges of their wings become extremely hot compared to the internal structure of the wing due to the aerodynamic flow of air on the leading edge of the wing. The hot leading edge skin of the wing is connected to an internal wing spar. The changes in temperature between the hot leading edge of the wing and the cooler spar causes thermal expansion stress at the joint connecting the skin to the spar. If heavier materials are used to sustain the stress in the connecting joint the aircraft weight will increase, causing the useful load and performance of the aircraft to decrease.

SUMMARY OF THE INVENTION

Slotted joints allow a more structurally efficient, lower weight attachment between two parts made from materials having different coefficients of thermal expansion or similarly expansive materials differing significantly in temperature. The slotted joints have tabs which bend to minimize stresses induced by differential thermal expansion or contraction. The bending of the material in the slotted joint prevents large thermal stresses from being generated in the joint area. The use of slotted joints lowers the weight of the material used in the joint, which increases vehicle payload and performance. Slotted joints can be used with cryogenic tanks which get very much colder than the supporting structure, wing skins which get very much hotter than the internal supporting structure, or any applications wherein thermal gradients and disparate expansion coefficients conspire to induce stress.

OBJECTS OF THE INVENTION

It is an object of the invention to increase the ease of assembly of joints.

It is an object of the invention to reduce the cost of assembling a structure.

It is an object of the invention to reduce the thermally induced stress at joints in a structure.

It is an object of the invention to reduce the weight of a structure.

It is an object of the invention to reduce the stiffness loss in the overall structure.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
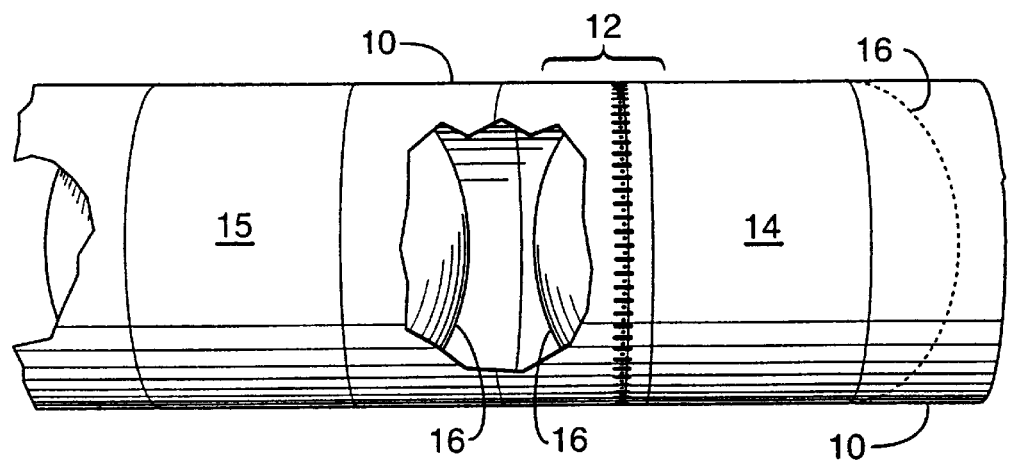
FIG. 1 shows a side view of an intertank joining cryogenic tanks.

FIG. 1 shows cylindrical intertanks 10 connecting cylindrical cryogenic tank 14 to adjacent structures (such as another cryogenic tank 15) in a launch vehicle. A connection between the intertank 10 and cryogenic tank 14 occurs in joint area 12 which is shown in greater detail in FIGS. 2–7. For rockets it is important for the weight of the structure to be borne by the shell or outside surface of the vehicle. The outside surface has to be as aerodynamically smooth as possible to reduce drag. The connection between sections of the rocket have to be stiff to keep all the sections of the rocket from bending, twisting, and vibrating, yet able to accommodate local stresses due to thermally induced size changes.

Figure 2:
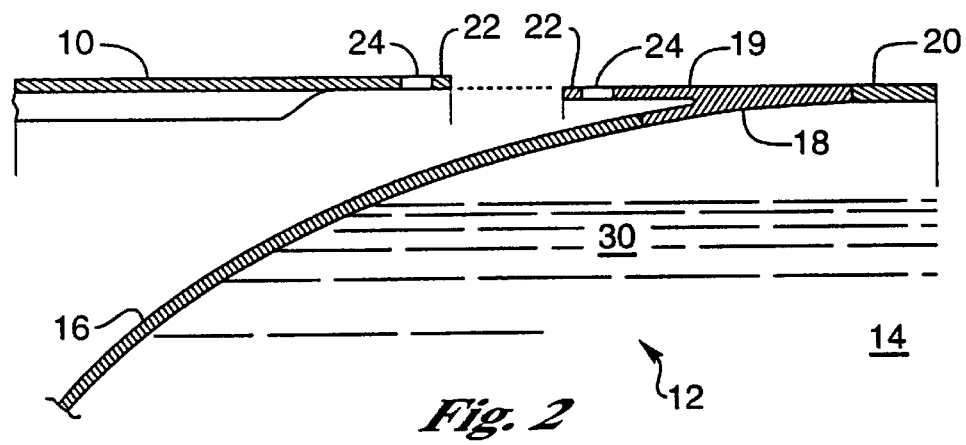
FIG. 2 shows an unassembled side view of the slotted joint fastener in the joint area of FIG. 1.
Figure 3:
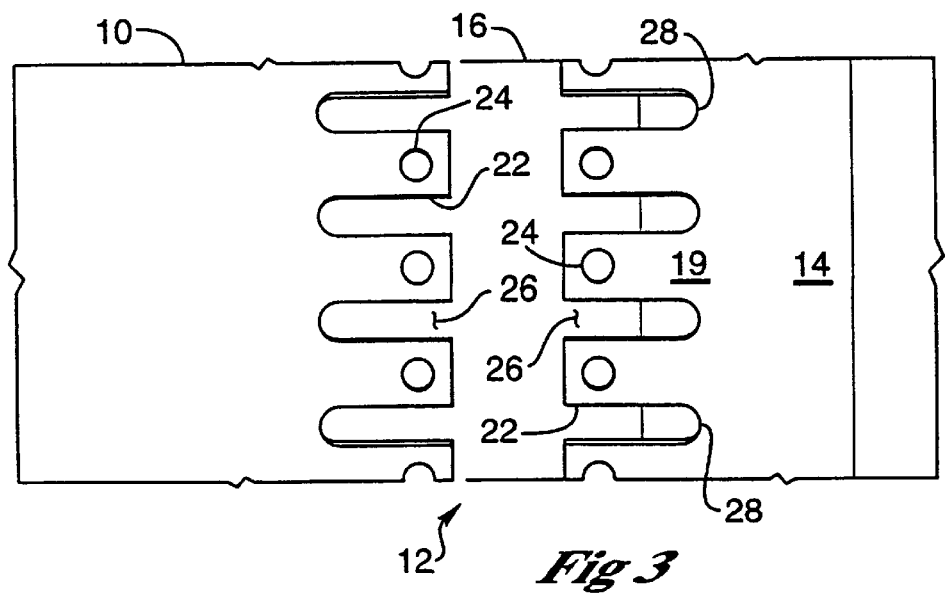
FIG. 3 shows an unassembled cross section of the tank—intertank slotted joint.

FIG. 2 is an enlarged cross section of the joint area 12 in FIG. 1. In FIG. 2, shown is a portion of cryogenic tank 14 having a dome 16, a cylindrical section 20, and a Y-ring 18 with a flange 19. As more clearly seen in FIG. 3, flange 19 has tabs 22 with slots 26 therebetween. Each tab 22 has an aperture 24 for receiving a fastener 32 (see FIG. 5) or other attachment device.

The intertank 10 has a portion with tabs 22 having slots 26 therebetween. Each tab has a matching aperture 22 for receiving a bolt or other fastening device.

Figure 4:
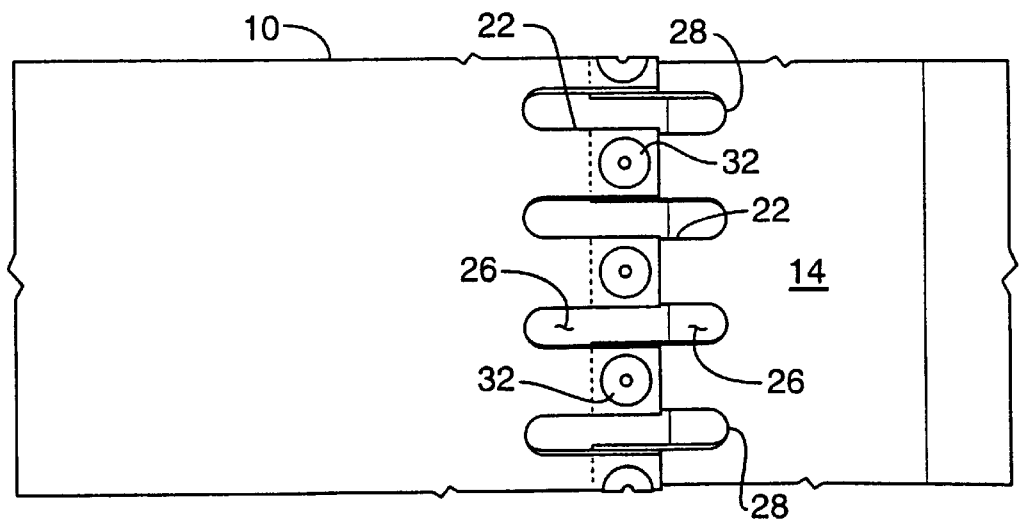
FIG. 4 shows an assembled side view of the slotted joint fastener in the joint area of FIG. 1.
Figure 5:
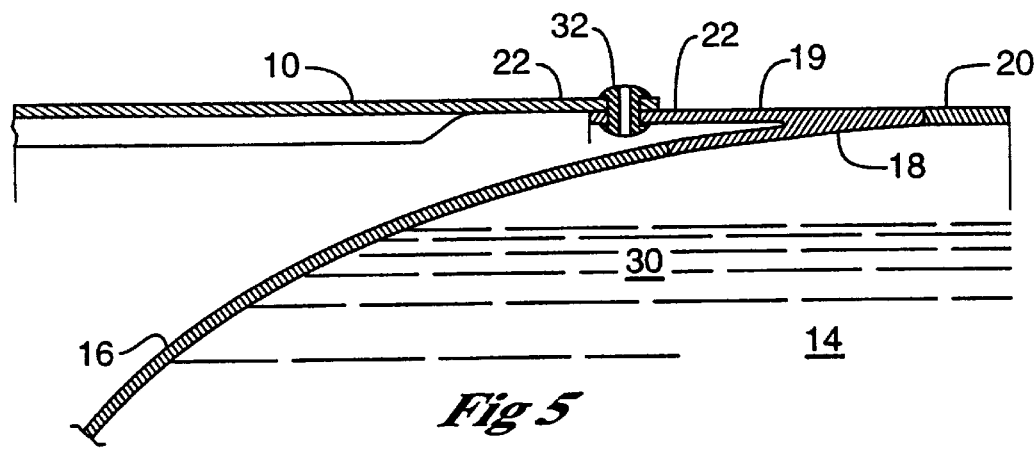
FIG. 5 shows an assembled cross section of the tank—intertank slotted joint.

As shown in FIGS. 4 and 5, the cryogenic tank 14 is assembled to the intertank 10 by overlapping the apertures 24 in tabs 22 and inserting fasteners 32 through the apertures 24, thus making the joint easy to assemble.

Figure 6:
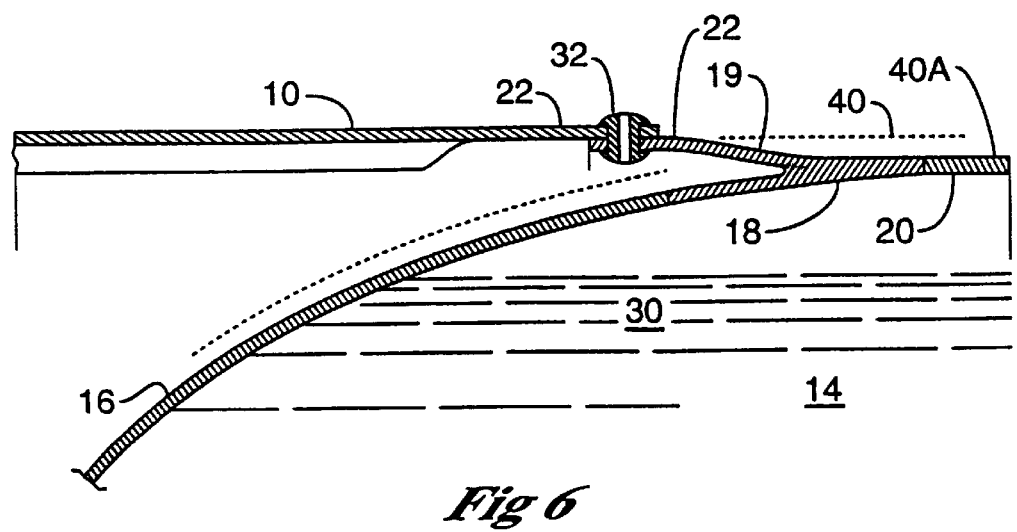
FIG. 6 shows an assembled cross section of the tank—intertank slotted joint after deformation due to thermal stress.

As shown in FIG. 6, when a cryogenic fluid 30 is added to cryogenic tank 14 the cryogenic tank, which is generally made of aluminum, contracts from position 40 (dashed line) to position 40A due to the decrease in temperature caused by the cryogenic fluid 30. The intertank 10 material can be made of a polymer composite which has a different coefficient of thermal expansion and is not as cold as the aluminum of the cryogenic tank 14. Therefore a larger contraction of the cryogenic tank 14 will occur relative to that of the intertank 10, causing the cryogenic tank 14 diameter to decrease as shown in FIG. 6 (deformations exaggerated for clarity).

Figure 7:
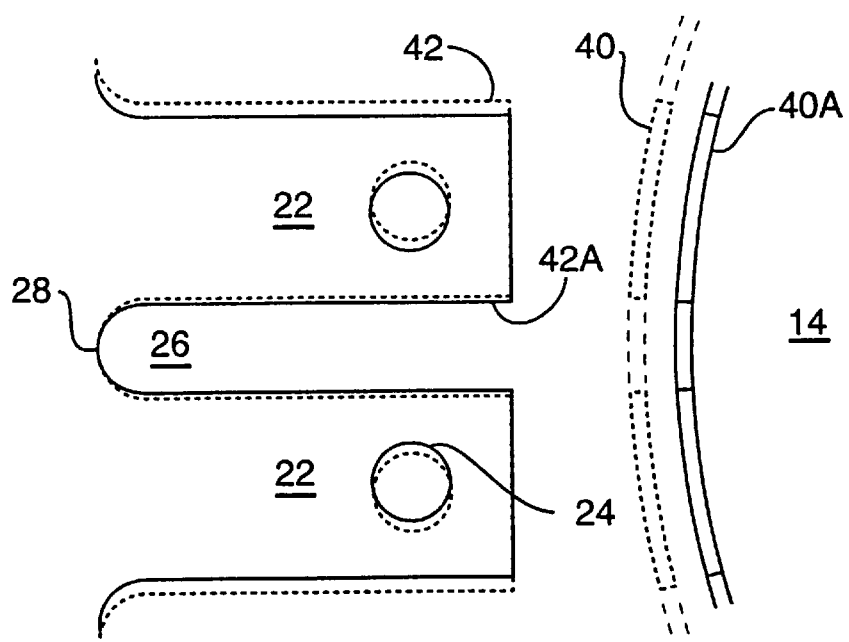
FIG. 7 shows a side view of a slotted joint undergoing a radial deformation.

As shown in FIG. 7, the cryogenic tank 14 shrinks in radius from position 40 (dashed) to 40A. Deflections are exaggerated in the figure for clarity. The bending of the tabs 22 reduces the stress that would otherwise have to be borne by the materials in the joint area 12 were they part of a monolithic structure.

The tabs 22 can be engineered to be of different lengths, widths and thicknesses to minimize the stresses while maintaining a load-bearing connection between the intertank 10 and the cryogenic tank 14.

The radius of slot end 28 at the base of each tab 22 can be larger or smaller, depending on the stress to be minimized and the stiffness desired. Further, the number of tabs 22 per unit length and the width of the slots 26 can also be variously engineered for the forces needed to be minimized and the amount of bending compliance required of the tabs 22. The shape of slot end 28 can be changed from a radius or arched shape to a V shape or other shapes depending on the amount of stress relief desired.

In other embodiments the tabs 22 may be only on the intertank 10 with the cryogenic tank being a solid body or only on the cryogenic tank 14 with the intertank 10 being a solid body, since the slots on only one body may be sufficient to minimize the thermal stresses.

Figure 8:
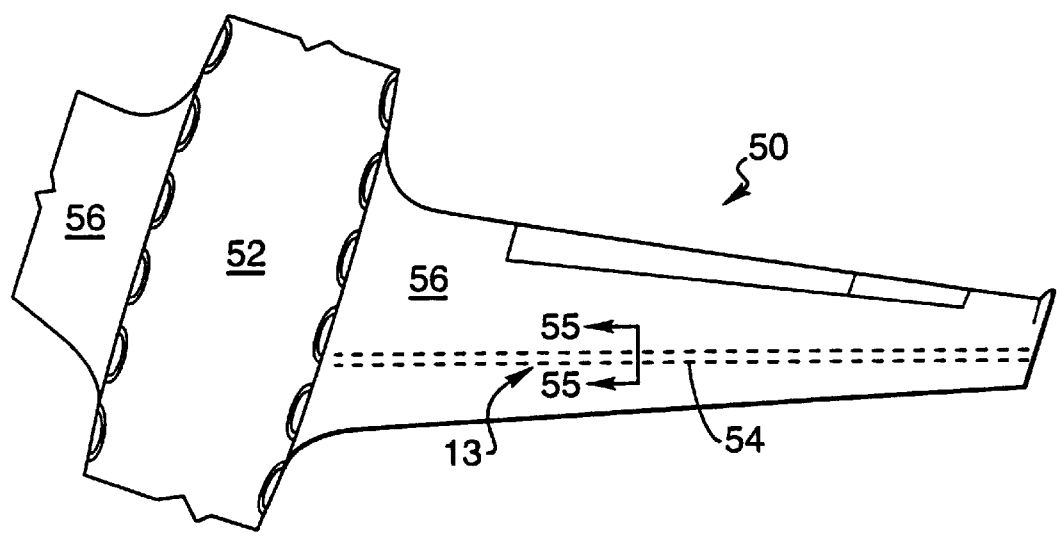
FIG. 8 shows a top view of a wing with a spar.
Figure 9:
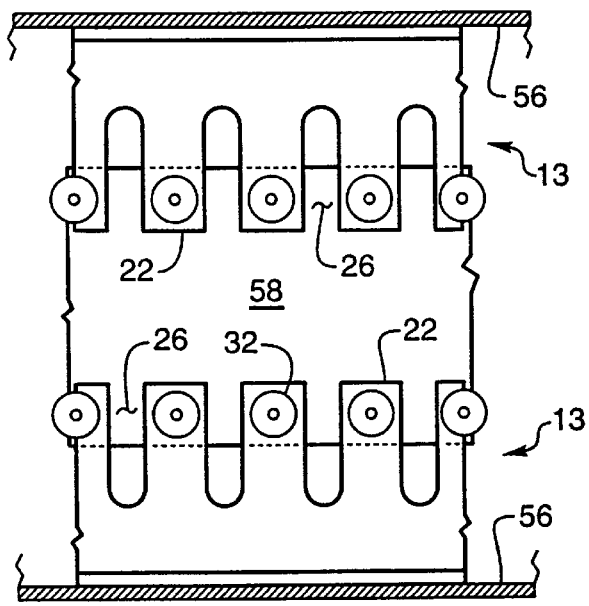
FIG. 9 shows a front cross section of the wing in FIG. 8.
Figure 10:
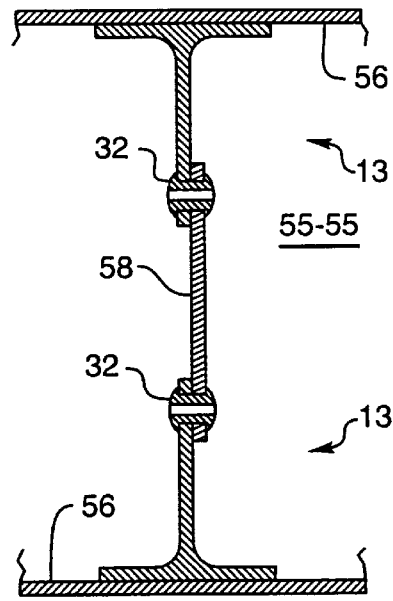
FIG. 10 shows a side cross section of the wing in FIG. 8.
Figure 11:
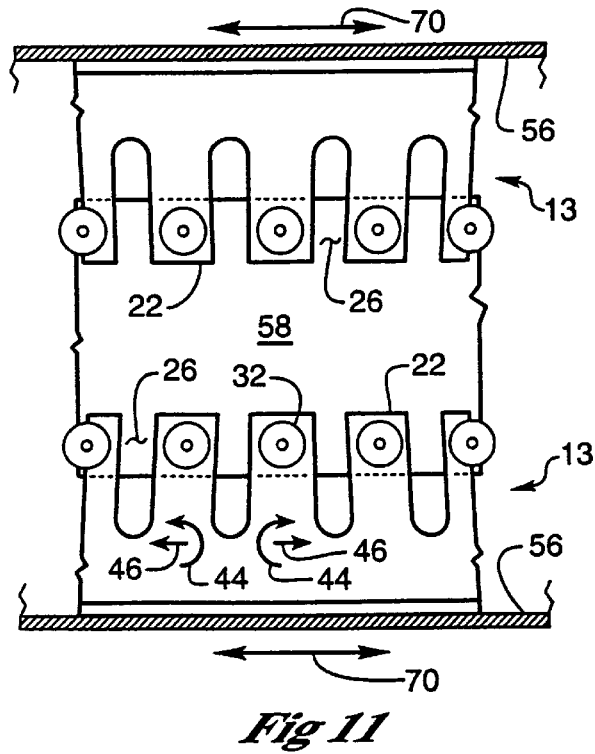
FIG. 11 shows a front view of a slotted joint undergoing a linear deformation of the spar from FIG. 9.

FIG. 8 shows a wing 50 connected to a fuselage 52 of an aircraft. The wing 50 has a spar 54 which supports skin 56. FIGS. 9 and 10 show a cross section detail 55—55 of FIG. 8, showing flex joints 13 having tabs 22 with slots 26 therebetween which are a part of, or connected to, the skin 56 of wing 50. A web 58 is connected to the flex joints 13 by fasteners 32 extending through apertures (similar to those shown as 24 in FIG. 3) in the web 58 and the tabs 22. Alternatively, web 58 may also have tabs 22 as indicated in FIG. 4. As shown in FIG. 11, when the aircraft speed increases, the skin 56 on the wing 50 will heat up and expand as indicated by arrows 70. As the skin 56 expands, flex joint 13 is deformed, causing a moment 44 and shear 46 in tabs 22. The web 58 being insulated from the extreme heat of the skin 56, does not expand as much. The tabs 22 bend to minimize the stress created by the differential thermal expansions of the skin 56 and the web 58. The expansion difference is particularly pronounced when the skin 56 is made of aluminum, titanium or other metals or metal alloys having a much larger coefficient of thermal expansion than the web 58, which may be made out of a low-expansion composite material such as ceramic fiber or graphite-epoxy.

Figure 12:
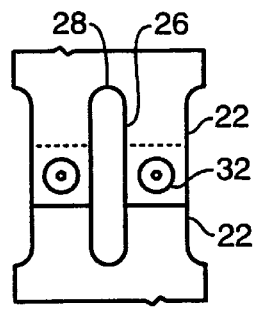
FIG. 12 shows a top view of the slotted joint fastener having straight slots and a radius the same size as the slots width.
Figure 13:
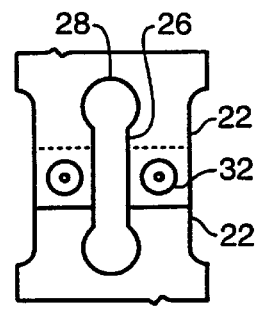
FIG. 13 shows a top view of the slotted joint fastener having straight slots and a radius greater than the slots width.
Figure 14:
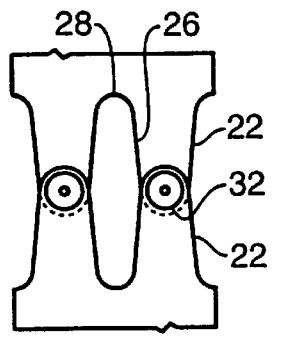
FIG. 14 shows a top view of the slotted joint fastener with a V shaped slot.
Figure 15:
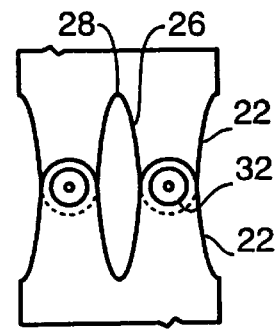
FIG. 15 shows a top view of the slotted joint fastener with an oval slot.

FIGS. 12–15 show various embodiments of the invention wherein the slot end 28 can be a semi circle of the same diameter as the width of slots 26 as in FIG. 12 or can be a slot end 28 larger than the width of slots 26 as shown in FIG. 13. The slots 26 may also be V-shaped as in FIG. 14, elliptical as in FIG. 15, or may have another shape predetermined to allow the tabs 22 to flex and minimize stress.

Figure 16:
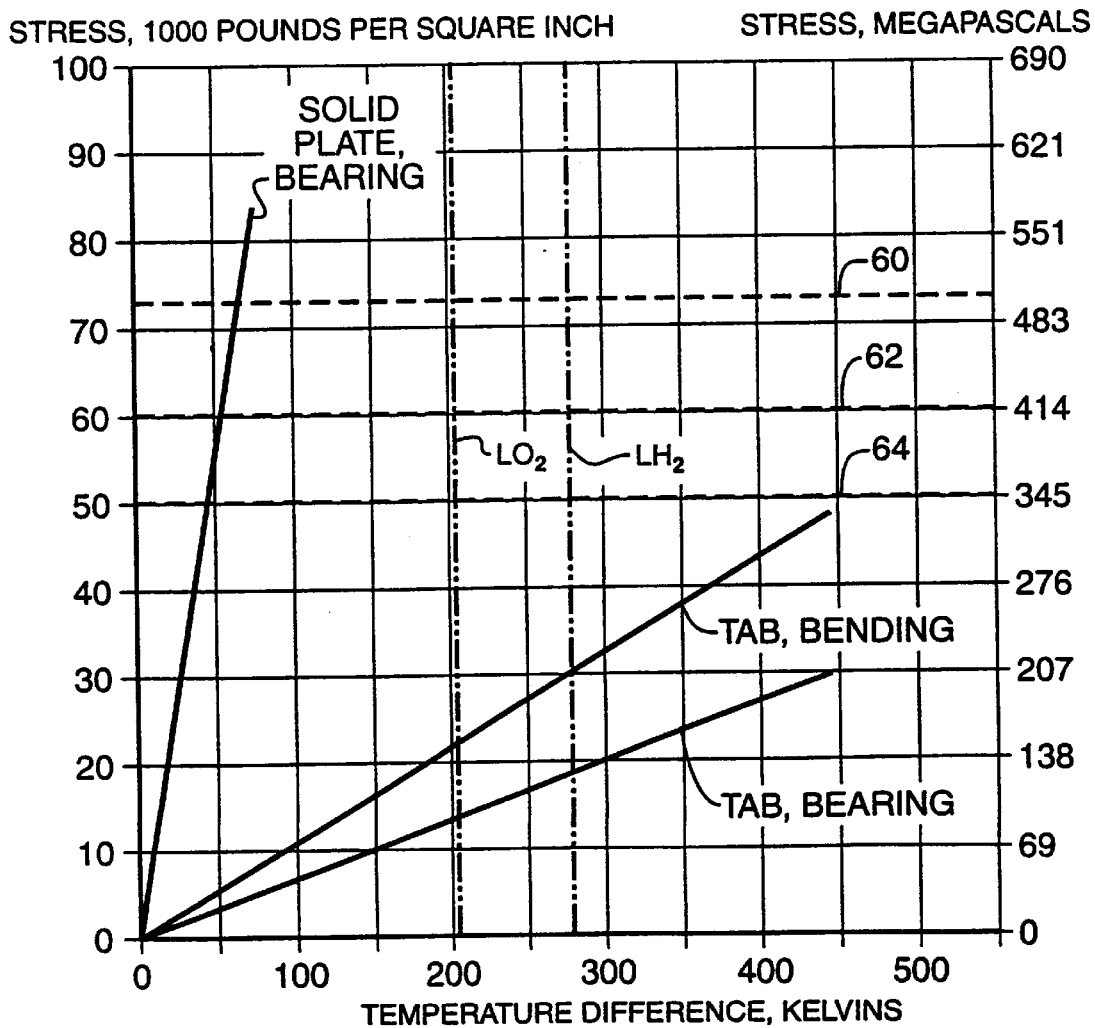
FIG. 16 shows a table plotting stress versus temperature for a solid plate joint and a slotted joint.

FIG. 16 is a graph comparing the thermally induced stress on a solid plate joint, compared to a flex joint having tabs, as a function of temperature difference in a joint of the type shown in FIG. 2. Temperature differences for liquid oxygen ($LO_2$) and liquid hydrogen ($LH_2$) are indicated as examples of liquids stored in the cryogenic tank 14. As the temperature difference between the two joined parts increases, the induced bending and bearing stresses increase. Representative allowable bearing stress for aluminum is indicated by stress level 60, the representative ultimate compressive stress for graphite-epoxy composite is indicated by level 62, while level 64 indicates representative allowable compressive stress for aluminum.

In joints between monolithic parts, (solid plate, bearing) the bearing stress rises quickly, such that bearing failures (at the fastener hole) will occur at a relatively low temperature difference. Alternatively, the thickness of the solid plates would have to be increased by about ten times to reduce the stress to the same level as in the tab joint design. The selected compliance direction of the tab joint reduces the bearing stress, so that acceptable flight loads can still be carried simultaneously by the joint. Bending stress at the tab base is also shown in FIG. 16, and is minimized by optimizing the various design features of the joint.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A stress relief joint comprising:

a first body having a plurality of tabs defining slots therebetween, each tab spaced from adjacent tabs by the slots, each slot having a slot radius between adjacent tabs about which the tabs flex, and each tab defining an aperture for receiving a fastener;

a second body defining a plurality of apertures proximate a first end thereof, said first and second bodies positioned such that the apertures of the first body and the second body overlap for receiving the fastener to connect said first and second bodies, said first and second bodies also being positioned such that the first end of said second body coincides with a medial portion of at least one slot so that at least a portion of at least one slot extends beyond the first end of said second body and remains uncovered by said second body thus allowing the tabs to flex in multiple directions.

2. A stress relief joint as in claim 1 wherein:

the second body has a plurality of tabs defining slots therebetween, each tab spaced from adjacent tabs by the slots, each slot having a slot radius between adjacent tabs about which the tabs flex, and each tab defining an aperture for receiving the fastener to connect said the first body to the second body.

3. A stress relief joint as in claim 1 wherein:
the tabs have straight sides.

4. A stress relief joint as in claim 2 wherein:
the tabs have curved sides.

5. A stress relief joint as in claim 2 wherein:
the tabs have straight sides.

6. A stress relief joint as in claim 1 wherein:
the tabs have curved sides.

* * * * *